United States Patent [19]

Altmann et al.

[11] Patent Number: 4,964,674
[45] Date of Patent: Oct. 23, 1990

[54] HEATED SEAT

[75] Inventors: Dieter Altmann, Grundau-Lieblos; Eberhard Haupt, Grundau-Rothenbergen; Manfred Knüppel, Cologne, all of Fed. Rep. of Germany

[73] Assignee: I.G. Bauerhin GmbH, Grundau-Rothenbergen, Fed. Rep. of Germany

[21] Appl. No.: 320,117

[22] Filed: Mar. 7, 1989

[30] Foreign Application Priority Data

Mar. 8, 1988 [EP] European Pat. Off. ........ 88102949.0

[51] Int. Cl.⁵ ............................................. A47L 7/72
[52] U.S. Cl. .................................... 297/180; 219/217
[58] Field of Search .................... 297/180; 5/421, 284; 219/217

[56] References Cited

U.S. PATENT DOCUMENTS

| | | | |
|---|---|---|---|
| 2,579,964 | 12/1951 | Reynolds | 5/421 X |
| 3,136,577 | 6/1964 | Richard | 297/180 |
| 3,493,721 | 2/1970 | Kamitani et al. | 297/180 |
| 3,924,284 | 12/1975 | Nelson | 5/284 X |
| 4,044,221 | 8/1977 | Kuhn | 219/217 |
| 4,047,254 | 9/1977 | Hamasu | 5/421 X |
| 4,607,624 | 8/1986 | Jefferson | 219/217 X |
| 4,695,091 | 9/1987 | Altmann et al. | 297/180 |
| 4,813,738 | 3/1989 | Ito | 297/180 |
| 4,825,048 | 4/1989 | Altmann et al. | 219/217 X |
| 4,825,868 | 5/1989 | Susa et al. | 5/421 X |

FOREIGN PATENT DOCUMENTS

| | | | |
|---|---|---|---|
| 0235798 | 9/1987 | European Pat. Off. | 297/180 |
| 2916110 | 10/1980 | Fed. Rep. of Germany | 5/421 |
| 3505652 | 8/1986 | Fed. Rep. of Germany | . |
| 3513909 | 10/1986 | Fed. Rep. of Germany | . |
| 636869 | 5/1950 | United Kingdom | 219/217 |
| 2200806 | 8/1988 | United Kingdom | 297/180 |

Primary Examiner—José V. Chen
Attorney, Agent, or Firm—Marmorek, Guttman & Rubenstein

[57] ABSTRACT

A heated seat comprises a molded body, a covering fabric and a first foil lining supported by the molded body, a meandering heating wire disposed in a plane adjacent the covering fabric, the heating wire being covered by a second foil. A connecting cable delivers electric current to the heating wire. The heating wire is connected to the connecting cable on a connecting plate which is disposed at a distance from the plane of the heating wire. A structural block made of a pliant material, such as a foam material, is disposed between the plane of the heating wire and the connecting plate. The connecting plate is at an angle to the plane of the heating wire and the structural block is wedge-shaped in cross-section.

13 Claims, 3 Drawing Sheets

HEATED SEAT

BACKGROUND OF THE INVENTION

The instant invention relates to a heated seat, especially used in vehicles, wherein an electrical resistance heater is installed on the foil-lined inside of the covering fabric.

The German patent application No. P 35 05 652.2 of Feb. 18, 1985, discloses a process for the production of a seat heater which is especially suitable for installation on foam cushion cores because of its great elasticity. The utilization of this heater with seat and back cushions produced by a deep-drawing process is set out in claim 3 of that document.

In the manufacture of such seat heaters, the connection between the actual heating elements installed on the covering fabric and the electrical feed line causes difficulties. The connecting structure which connects the heating elements to the feedlines also supports a heat regulator and is therefore difficult to position without coming into contact with the covering fabric. The feed line can be taken through a recess on the form frame with relative ease. The connecting structure is placed on the covering fabric and after the foaming process produces a hard spot at that location which tends to produce breaks. If the junction then hangs practically freely in space, it generally becomes twisted and thus produces a heat conductor crossing and thus a hot spot which generally also leads to a break when it has become oxidized.

It is therefore the object of the instant invention to position the connecting plate bearing the heat regulator in such manner that it cannot be felt at the surface of the covering fabric (which can be made of cushion material, leather or artificial leather), cannot become twisted and thus produce a heat conductor cross-over, so that only perfect, inwardly directed contours are formed in the covering material of the seat. The seat can therefore be formed by a ram in a vacuum mold to produce contours which do not hinder the pressure process as such and which reliably avoid a collision with the pressure tools through secure placing of the connection plate in its predetermined position.

In this connection provision must also be made to ensure that the insertion process of the heated covering fabrics into the different deep-draw molds for the covering fabrics equipped with heaters which are put on foam in a so-called carousel that runs continuously or semi-continuously in pre-programmed clock times, be no different from the insertion process for non-heated covering fabrics, i.e., that they require no or so little expenditure in time that they can be produced simultaneously without delay in production within the framework of normal manufacture.

SUMMARY OF THE INVENTION

The solution according to the invention of this problem provides for a connection plate to be installed at a distance from the plane of the heat conductors. The connection plate is provided for the attachment of the connection cable and for the reception of the temperature regulator. The connections of the heat conductors are fixed on the inside of the plastic-lined covering material or of the covering foil. A structural block made of foam material or other elastic material is provided between the inside of the covering fabric or covering foil and the connection plate and determines the distance therebetween. The structural block is connected to both planes and is located at a predetermined location. The covering fabric is thus prepared to be placed with its visible side lying against the negative form of the seat or backrest element and the remaining space is filled with cushion foam.

This design ensures that the connection plate is located at a distance from the inside of the covering fabric or the covering foil of the heat conductor on an elastic structural block. It is advantageous for the structural block to have the same elastic properties as the cushion foam. This ensures that the occurrence of unequal stresses when the foam is put into the mold and during later stress-exposure of the cushion element is avoided and also ensures that a sufficient remaining distance to the heating element is left.

The load-free height of the elastic structural block is preferably between about 15 and 30 mm. In order to achieve saturated foam coverage of the structural block in the cushion foam without reaching back-up and without "bubbling," it is given a wedge-shaped or round base surface.

It is further provided that the elastic structural block be higher by 20 to 50% on the side of the connection cable than on the side towards the cushion interior. A traction-free design of the connection cable is thus facilitated.

Independently of the above, provisions are made for the connections of the heat conductors to be carried on the inside of the covering fabric on the side of the connection cable to the connection plate in such manner that the connections of the heat conductor remain without stress when pull is exerted on the connection cable. The delimiting sides of the covering fabric should be finished by a skin or other measure so that no hard spots that could be felt later and produced during the foaming process due to the entry of foaming liquid.

It is furthermore advantageous for the elastic properties of the structural block to be the same as those of the foam cushion.

Finally it should be emphasized again that the covering fabric can be made of textile, leather or artificial leather.

The installation according to the invention of the connection plate on the foil-lined inside of the covering fabric as well as details of the design of the seat or backrest elements are explained in greater detail with reference to the enclosed drawings of embodiments given as examples.

DETAILED DESCRIPTION OF THE INVENTION

Figure 1:
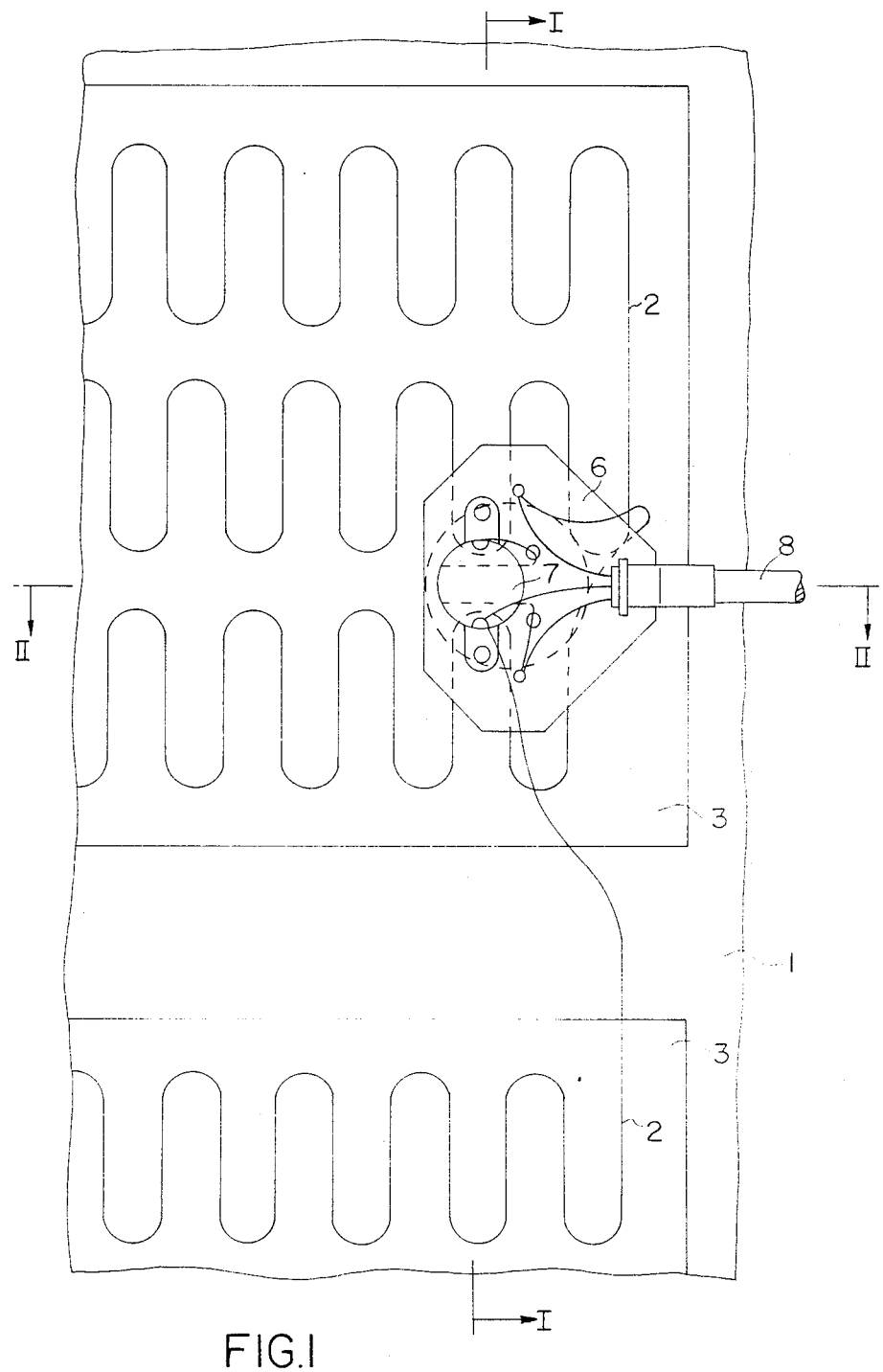
FIG. 1 shows a top view of the foil-lined inside of the covering fabric, the heat conductors of the electrical resistance heater protected by a covering foil as well as the connection plate for the junction of the connection cable, said connection plate being at the same time the carrier of the temperature regulator.
Figure 2:
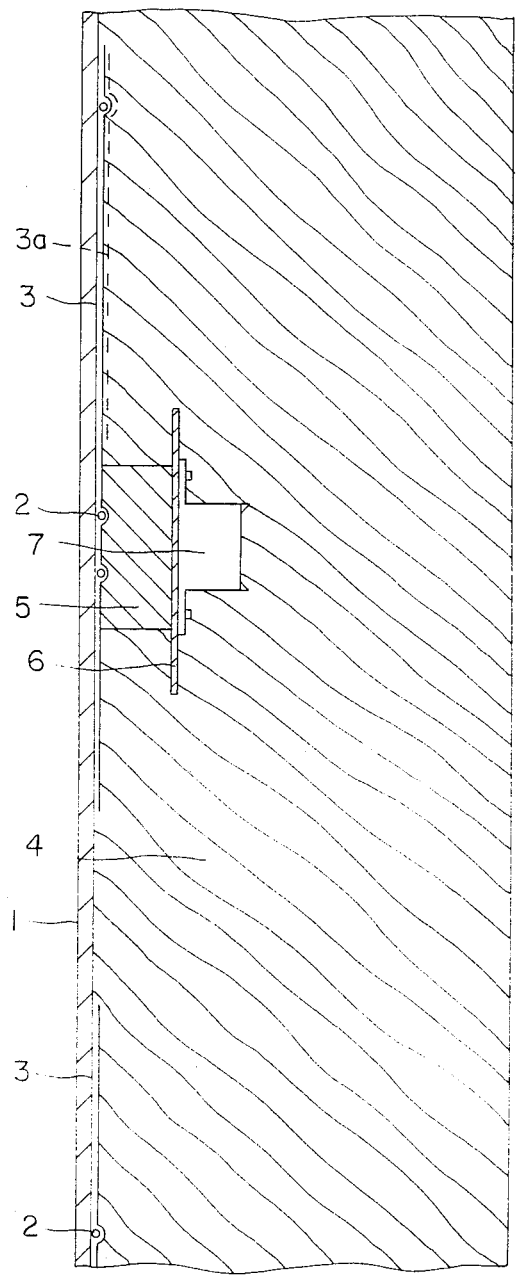
FIG. 2 shows a section I—I through FIG. 1 and clarifies the position of the elastic structural block.
Figure 3:
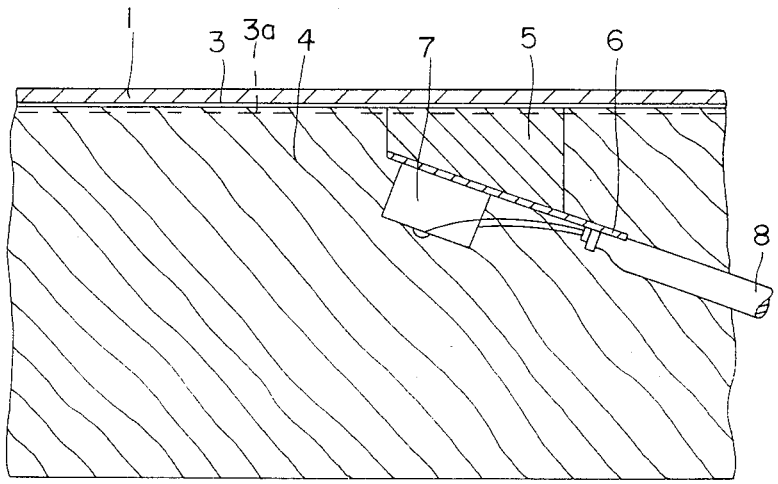
FIG. 3 shows a section II—II through FIG. 1 and clarifies the beveled, i.e., wedge-shaped configuration of the structural block for the connection plate.
Figure 4:
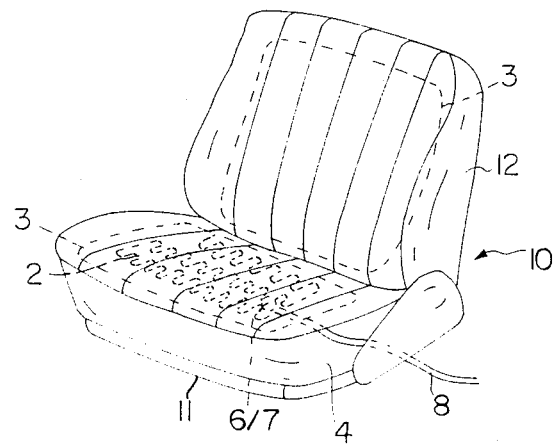
FIG. 4 shows a heated seat in accordance with the present invention.

Referring to the figures, the heated seat 10 comprises molded seat and backrest portions 11, 12 respectively which support a cushion 4. The covering fabric 1 is oriented towards the cushion 4, i.e., it is designed with a covering foil 3 and foil lining 3a on the inside and is provided with an electrical resistance heater consisting of meandering heat conductors 2 corresponding to the shape of the seat or backrest. The heat conductors 2 are furthermore held in their positions and are insulated overall or beyond the dimensions of the individual heating surfaces by a covering foil 3.

On the lined covering fabric 1 or on the covering foil 3 in this embodiment, a cylindrical elastic structural block 5 with a round top and base (shown as a dashed line in FIG. 1) is attached. The round base of structural block 5 bears the connection plate 6. The height of structural block 5 expands in wedge shape towards the outside of the seat or backrest surface. The non-stressed median height of the structural block 5 made of elastic foam measures approximately 25 mm. The elastic properties of the structural block 5 are the same as those of the cushion 4.

The delimiting bushing of the connection cable 8 is fixed, the temperature regulator 7 is attached and the connections for the junction with the heat conductors 2 are constructed on the connection plate 6. The connections to the heat conductors 2 and to the connections on the connection plate 6 are of sufficient length so that no traction is exerted on the connections of the heat conductors 2 even when traction is exerted on the connection cable 8.

The inclined design of the structural block 5 or of the connection plate 6 connected to it contribute to the reduction of the effects of cable pull.

While the invention has been described by reference to specific embodiments, this was for purposes of illustration only and should not be construed to limit the spirit or the scope of the invention.

We claim:

1. A heated seat, comprising:
   a molded body having an inner and an outer surface,
   cushioning material located along the inner surface of said molded body,
   a covering fabric on top of said cushioning material away from said molded body,
   a covering foil located between said covering fabric and said cushioning material,
   an electrical heating element substantially located between said covering fabric and said covering foil,
   a structural block made from pliant material beneath said covering foil and extending into said cushioning material, said structural block including a top oriented toward said covering fabric, a base oriented toward said cushioning material, and a side wall,
   a connection plate attached to the base of said structural block thereby being spaced at a distance from said covering fabric and said covering foil,
   a portion of said electrical heating element extending to said connection plate, and
   connection cable means electrically connected to said portion of said electrical heating element for delivering electric current to said electrical heating element, said connection cable means being mounted on said connection plate at a distance from said covering fabric and said covering foil.

2. The heated seat of claim 1 further comprising a temperature regulator mounted on said connection plate.

3. The heated seat of claim 2 wherein said heating element comprises a meandering wire.

4. The heated seat of claim 2 wherein said heat element comprises a plurality of meandering wires.

5. The heated seat of claim 2 wherein said structural block is made from a foam material.

6. The heated seat of claim 2 wherein said structural block is made from an elastic material.

7. The heated seat of claim 2 wherein said connection plate defines a plane which is at an angle to said plane of said heating element.

8. The heated seat of claim 2 wherein said structural block is wedge-shaped in cross-section.

9. The heated seat of claim 8 wherein a portion of said sidewall of said structural block in the region of said connection cable is about 20 to 50% longer than a diametrically opposite portion of said sidewall.

10. The heated seat of claim 8 wherein said structural block has an unstressed height ranging from about 15 mm to 30 mm.

11. The heated seat of claim 8 wherein said structural block has a round base surface for receiving said connection plate.

12. The heated seat of claim 2 wherein said heating element is substantially free from traction when said connecting cable means is pulled.

13. The heated seat of claim 1 wherein the pliant properties of said structural block are substantially the same as for said cushioning material.

* * * * *